United States Patent [19]

Yen et al.

[11] Patent Number: 4,902,456
[45] Date of Patent: Feb. 20, 1990

[54] FLUOROCARBON MEMBRANES AND PROCESS FOR MAKING FLUOROCARBON MEMBRANES

[75] Inventors: Larry Y. Yen, Tewksbury; George Lopatin, Newton Centre, both of Mass.

[73] Assignee: Millipore Corporation, Bedford, Mass.

[21] Appl. No.: 190,285

[22] Filed: May 4, 1988

[51] Int. Cl.⁴ .................. C08L 9/26; B01D 13/00
[52] U.S. Cl. ..................................... 264/41; 55/16; 210/500.23; 210/500.36; 264/177.17; 264/178 R; 264/209.1; 521/61; 521/64; 521/134; 521/145
[58] Field of Search ............. 264/41, 177.17, 178 R, 264/209.1; 521/61, 64, 134, 145; 210/500.23, 500.36; 55/16

[56] References Cited

U.S. PATENT DOCUMENTS

| | | | |
|---|---|---|---|
| 2,915,483 | 12/1959 | Barnhart | 521/145 |
| 3,379,658 | 4/1968 | Kemper | 521/61 |
| 3,518,332 | 6/1970 | Sklarchuk et al. | 521/61 |
| 3,536,796 | 10/1970 | Rock | 521/61 |
| 4,181,983 | 1/1980 | Kulkarni | 521/61 |
| 4,623,670 | 11/1986 | Mutoh et al. | 521/134 |
| 4,702,836 | 10/1987 | Mutoh et al. | 521/145 |

Primary Examiner—Morton Foelak
Attorney, Agent, or Firm—Paul J. Cook; Andrew T. Karnakis

[57] ABSTRACT

Microporous poly (tetrafluoroethylene-co-perfluoro (alkyl vinyl ether)) (PFA) or poly(tetrafluoroethylene-co-hexafluoropropylene) (FEP) membrane or hollow fibers are formed from a melt blend of 10 to 35 weight percent of PFA or FEP and a chlorotrifluoroethylene oligomer solvent. The melt blend is shaped and cooled to effect phase separation of the PFA or FEP from the blend. The solvent is removed from the PFA or FEP by extraction and the porous PFA or FEP is dried under restraint to prevent shrinkage.

3 Claims, 5 Drawing Sheets

FLUOROCARBON MEMBRANES AND PROCESS FOR MAKING FLUOROCARBON MEMBRANES

BACKGROUND OF THE INVENTION

This invention relates to a process for producing microporous poly (tetrafluoroethylene- co-perfluoro (alkyl vinyl ether)) (PFA) or poly (tetrafluoroethylene-co-hexafluoropropylene)(FEP) membranes and to the membrane so-produced.

Microporous membranes include thin sheets and hollow fibers generally formed from synthetic thermoplastic materials and having a substantially continuous matrix structure containing open pores or conduits of small size. The mean pore size range for pores of "microporous membranes" is not precisely defined in the art, but it is generally understood to extend from about 0.05 microns to about 10 microns. Microporous membranes having open pores thereby importing permeability are useful in filtration. Microporous membranes having closed pores are impermeable. While not useful in filtration they are useful in other applications such as for thermal insulation.

PFA and FEP polymers are desirable filtration membrane materials because of their excellent chemical and thermal stabilities. However, their inherent inert nature also renders them unamenable to be cast into membranes by conventional solution immersion casting processes. Currently, microporous membrane using similarly inert material is disclosed in U.S. Pat. Nos. 3,953,566; 3,962,153; 4,096,227; 4,110,392 and 4,187,390. The process disclosed in these patents comprises stretching sintered poly(tetrafluoroethylene) (PTFE) particles to create a pore structure characterized by nodes interconnected by fibrils. The pores are highly elongated in the stretch direction.

U.S. Pat. Nos. 4,623,670 and 4,702,836 disclose a process for forming microporous membranes from fluoropolymer resins selected from the group consisting of ethylene-tetrafluoroethylene copolymer, ethylene-chlorotrifluoroethylene copolymer and poly(chlorotrifluoroethylene). In this process, an inorganic filler is required in melt molding the polymer with a chlorotrifluoroethylene oligomer. The filler and oligomer are dissolved out of the polymer to form voids. The use of fillers in microporous membranes used in filtration is highly undesirable since all of the filler cannot be removed by solvation and the filler remaining may migrate into the filtrate and contaminate it. Although the three fluoropolymers disclosed by these patents have good chemical and thermal resistance, they are inferior in stabilities when compared to PFA and FEP.

A method for making a porous fluorinated polymer structure is disclosed in U.S. Pat. No. 4,434,116. It involves forming a solvated or partially solvated polymer/solvent mixture. The polymer for which this is applicable comprises a copolymer of tetrafluoroethylene and perfluoro vinyl ether with a sulfonyl fluoride (—SO$_2$F), sulfonate (—SO$_3$Z) or carboxylate (—COOZ) functional group wherein Z is a cation. The presence of the polar functional group greatly enhances the dissolution of this polymer. A variety of organic solvents have been reported. The method described is based on thermal phase separation of the polymer/solvent mixture and specified that the solvent (porogen) is a solid at room temperature and must crystallize after phase separation. The solvent is then removed from the blend in the solid state. No pore morphology or permeability data of the porous structure were given.

It would be desirable to provide a versatile process for producing microporous membranes from PFA or FEP which permits the use of liquid solvent to form a solution at elevated temperature which undergoes a liquid-liquid or a solid (crystalline)-liquid phase separation upon cooling where the polymer is the solid phase. In addition, it would be desirable to provide such a process in which the pore structure can be well controlled. In addition, it is advantageous to eliminate the need for stretching of the product during formation so that the product can be deposited directly upon a suitable substrate such as a porous woven or nonwoven substrate which cannot be stretched. If such a process were available, the membrane could be formed onto the porous substrate directly in order to produce laminates having increased mechanical strength which would permit their use in a wide variety of filtration environments.

SUMMARY OF THE INVENTION

In accordance with this invention, microporous films are formed from PFA or FEP having an open or closed pore structure. When the structure is open, the film is permeable to both liquids and gases and can be used as filtration media. When the pore structure of the film is closed, the porous film is impermeable and is useful as an insulator or as an encapsulation system for slow release of drugs, for example. A mixture is formed comprising between about 10 and about 35 weight percent FEP or PFA polymer and the remainder a solvent (porogen) comprising chlorotrifluoroethylene oligomer which permits liquid-liquid phase separation upon cooling from elevated temperature and subsequently solidification of the polymer. The mixture is heated and extruded to form a film or hollow fibers which then is quenched to effect phase separation of the fluorocarbon polymer from the solvent. The solvent is separated from the polymer by extraction and the resultant microporous polymeric membrane is dried under restraint in order to minimize or prevent membrane shrinkage and collapse. In addition, the present invention provides laminate products wherein a microporous PFA or FEP membrane sheet produced by the Process of this invention is adhered directly to a porous sheet substrate on one or both surfaces of the membrane without the use of an adhesive.

DESCRIPTION OF SPECIFIC EMBODIMENTS

Figure 1:
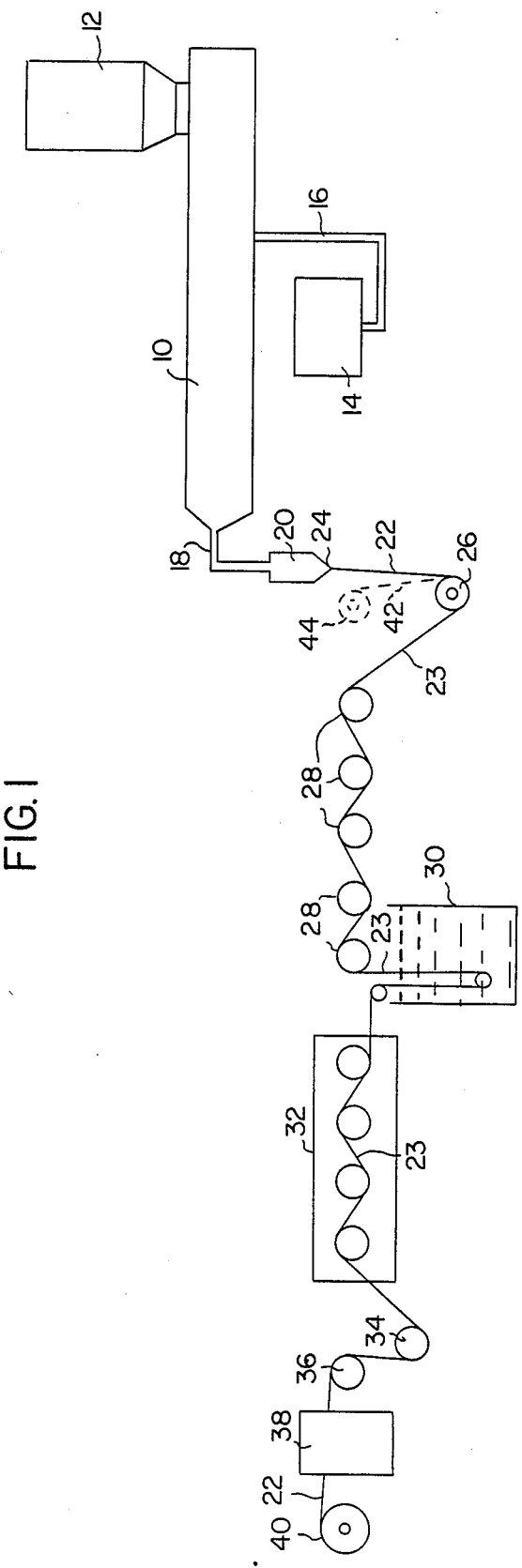
FIG. 1 is a flow diagram depicting the process of this invention.

In accordance with this invention, it has been found that membranes having a desired porosity and strength can be formed from a melt blend of poly(tetrafluoroethylene-co-perfluoro(aklyl vinyl ether)) (PFA) or poly(tetrafluoroethylene-co-hexafluoropropylene) (FEP) and a solvent which permits phase separation on cooling which comprises heated chlorotrifluoroethylene oligomer oil. Examples of PFA are commercially available as Teflon ® PFA (Dupont) and Neoflon ™ PFA (Daikin Industries). Examples of commercially available FEP include Teflon ® FEP (DuPont) and Neoflon ™ FEP (Daikin Industries). The PFA or FEP comprises between about 10 and about 35 percent weight percent of the blend. If a proportion of greater than about 35 weight percent in the blend is employed, the resulting membrane will have an undesirably low porosity while membranes formed from melt blends having a concentration of PFA or FEP less than about 10 percent are too weak for use in environments which required adequate mechanical stability. The use of the solvent has been found to be essential in the process of this invention.

In the first step of this invention a melt blend of the PFA or FEP and the solvent is prepared. The melt blend is formed by heating to at least the melting temperature of the PFA or FEP in the presence of the solvent and usually between about 280° and about 310° C., preferably in an inert atmosphere such as nitrogen or an inert gas. Oxygen tends to decompose the solvent at the high temperatures needed to form the melt blend. In the formation of the melt blend, the PFA or FEP and the solvent are mixed such as in the mixing barrel of a conventional twin screw extruding apparatus wherein the mixture is heated during mixing. The melt blend is passed from the extrusion zone through a slot die or a hollow fiber die to form molten film or molten hollow fiber. The molten film or hollow fiber then is quenched such as by being passed through a quench bath comprising water or the like at a temperature below the phase separation temperature of the melt blend to form gel film or gel hollow fiber. Alternatively, the extruded molten film or fiber can be quenched by being passed over cooled rollers at the appropriate temperature in order to effect phase separation of the melt blend to form membrane or fiber. When the extruded melt blend is quenched rapidly, the resultant product is characterized by open pores and therefore is useful in filtration. When the extruded melt blend is quenched slowly, the resultant product is characterized by a cellular morphology and therefore can be useful as in insulation or in encapsulation. The gel film or fiber then is immersed into a liquid bath which selectively imbibes the solvent thereby removing it from the PFA or FEP matrix without substantially softening or dissolving the polymer. The imbibing extraction liquid can also function as a quench medium such that the molten film or hollow fibers can be extruded directly into it. In this case, the quench and extraction steps take place in the same bath. Suitable imbibing liquids include 1,1,2 trichlorotrifluoroethene (Freon TF), 1,1,1 trichloroethane, carbon tetrachloride, hexane or the like. Extraction can be effected at a temperature between about 20° C. and about 50° C. in order to maximize solvent extraction while not softening the polymer. The polymer then is dried at a temperature usually between about 20° C. and about 50° C. and, during drying, the membrane may be restrained in order to prevent shrinkage. Optionally, the dry polymer can be heat-set by heating it to a temperature between about 200° C. and about 290° C. in order to further set the characteristic of the membrane. The membrane then can be rolled onto a core for storage.

The microporous product of this invention is characterized by pores of a mean pore size of between about 0.05 and about 5 micron.

A typical process useful for producing the membrane product of this invention is depicted in FIG. 1. An extruder 10 is provided which is connected to a hopper 12 from which PFA or FEP and chlorotrifluoroethylene oligomer mixture is introduced into the extruder 10. A tank 14 and conduit 16 are provided for introducing additional chlorotrifluoroethylene oligomer into the extruder 10 for admixture with the PFA or FEP. The melt blend of polymer and solvent is removed from extruder 10 through conduit 18 and into die 20 from which a sheet membrane 22 exits through orifice 24. Extrudate film 22 passes over chill roll 26 where the extrudate film 22 is cooled to a temperature for effecting microphase separation of the polymer and the solvent into a gel membrane 23. The gel membrane 23 then passes over the guide rolls 28 and then through the bath 30 containing a liquid extractant for the solvent. Membrane 23 then passes out of the bath 30 into an enclosed heating zone 32 wherein the edges of the membrane 23 are restrained while the membrane is optionally heated in order to dry the membrane. The membrane 23 then passes over guide rollers 34 and 36 into heat-setting zone 38 wherein the membrane 23 is heat-set by heating. The membrane 23 passes out of the heat-setting zone 38 onto wind up roller 40. In an alternative embodiment of this invention, a porous sheet substrate 42 which is housed on roller 44 can be directed to the chill roll 26 in order to contact the extrudate film 22 and be adhered to it without the use of an adhesive. This porous sheet can either be inserted between extrudate film 22 and chill roll 26, or alternatively be placed in contact with film 22 on the air side opposite to chill roll surface. Another embodiment will be to form a three layer laminate by sandwiching extrudate film 22 between two porous sheets. Since the substrate is porous, it will have little adverse affect on the liquid extraction steps, the drying step or the heat-setting step which are downstream of the chill roll 26.

The following examples illustrate the present invention and are not intended to limit the same.

EXAMPLE 1

Teflon ® PFA 350 (DuPont) pellets were ground into fine powder and mixed with chlorotrifluoroethylene oligomer (CTFE oil #27 by Halocarbon Products Corp.) in a stirred pressure vessel (Parr reactor model 4561) at a concentration of 20% (w/w) polymer. The mixture was heated to 310° C. under $N_2$ atmosphere and agitated at this temperature for 1 hour. This hot melt blend was then extruded through a 2" wide film die (also maintained at 310° C.) connected to the vessel via a bottom drain valve. The extrudate, in form of molten film, was immediately quenched with water at room temperature. The sample was then placed in hexane overnight to extract the Halocarbon oil in liquid form and dried at room temperature. Afterwards the sample became white in appearance.

Figure 2:
FIG. 2 is a photomicrograph at 1000× the cross-section of a microporous poly (tetrafluoroethylene-co-perfluoro(alkyl vinyl ether)) (PFA) membrane made in accordance with this invention.
Figure 3:
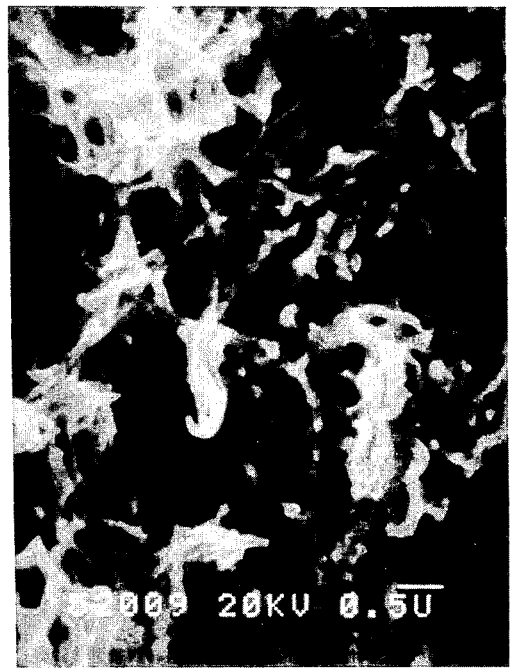
FIG. 3 is a photomicrograph at 15000× the cross section of the membrane shown in FIG. 2.

A sample of approximately 65 microns in thickness was examined by SEM. FIGS. 2 and 3 are photomicrographs of the cross-section of the sample revealing a "lacey" microporous structure. The porosity [1] (% void volume) of this sample is 65%. The melting point of this sample was determined by differential scanning calorimetry to be 304° C. (heating rate=10° C./min.). The nominal melting point range of PFA is 302°–310° C.

EXAMPLE 2

Figure 4:
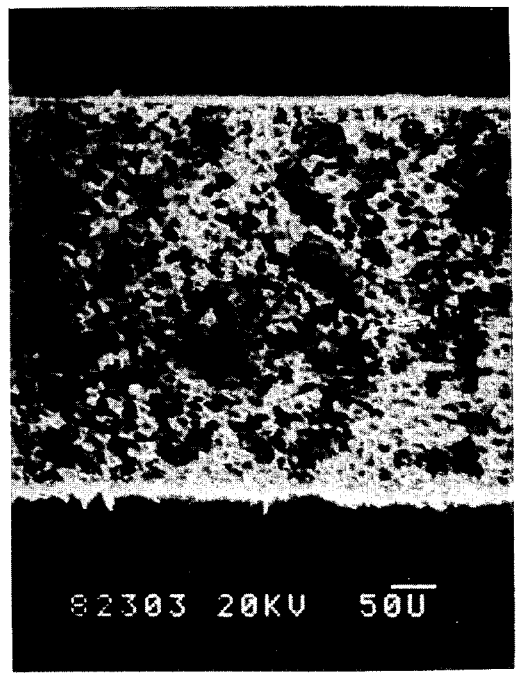
FIG. 4 is a photomicrograph at 150× the cross section of a microporous PFA sample with a cellular morphology.
Figure 5:
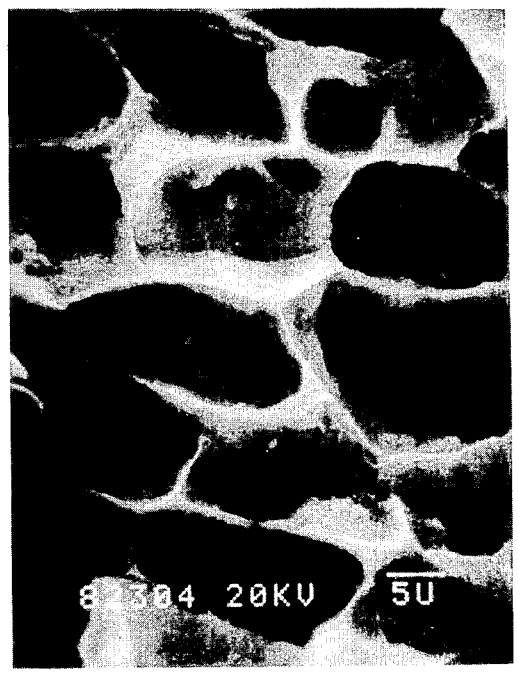
FIG. 5 is a photomicrograph at 2000× the cross section of the sheet of FIG. 4.

Another PFA sample was prepared by cooling the PFA and chlorotrifluoroethylene oligomer melt blend from Example 1 directly inside the extrusion die very slowly from 310° C. to room temperature under ambient condition. The total cooling time was approximately 3 hrs. The sample was removed after it reached room temperature and extracted as in Example 1. The SEM photomicrographs of the cross-section of this sample (approximately 450 microns in thickness) are shown in FIGS. 4 and 5. They revealed a regular cellular morphology which differs from the sample shown in FIGS. 2 and 3. The difference in structure is believed to be due to cooling rate variation. The porosity [1] of this sample is 77%.

EXAMPLE 3

Figure 6:
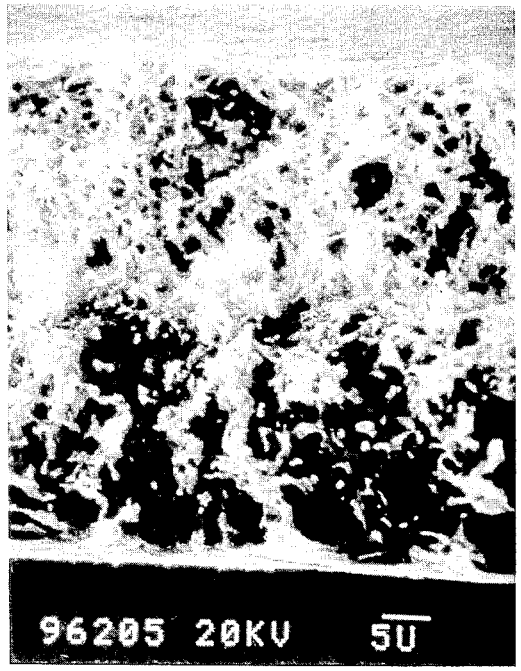
FIG. 6 is a photomicrograph at 1500× the cross section of a microporous poly (tetrafluoroethylene-cohexafluoropropylene) (FEP) made in accordance with this invention at 1500×.

Teflon ® FEP 100 (DuPont) pellets were ground into fine powder and mixed with chlorotrifluoroethylene oligomer (CTFE oil #56 by Halocarbon Products Corp.) at a concentration of 15% (w/w) polymer. The same methods for mixing, extrusion, quenching and extraction where used here as in Example 1. The temperature used for mixing and extrusion was at 300° C. The final sample is white and approximately 60 microns in thickness. The SEM photomicrograph of the cross-section of this sample is shown in FIG. 6. It revealed a microporous structure similar to that of PFA in FIG. 2. Its porosity [1] is 73%. The melting point was determined by differential scanning calorimetry to be 269° C. (heating rate=10° C./min). The nominal melting point of FEP is 271° C.

EXAMPLE 4

This example shows samples which are more permeable with "openings" on membrane surfaces as revealed by scanning electron microscopy (SEM). Powder grade Teflon ® PFA (DuPont TE9725) was blended with chlorotrifluoroethylene oligomer (CTFE oil #56 by Halocarbon Products Corp. to form a wet powdery mixture containing 45% (w/w) PFA polymer. This mixture was fed into a twin-screw compounding extruder (Baker-Perkins model MPC/V-30, L/D =13) via a screw feed hopper (Brabender model 05-30-000) equipped with wiper and stirrer blades. Additional pure CTFE oil #56 was injected downstream into the extruder near the mid section of the extruder barrel, using a metering pump (FMI model RP-G150o) for delivery. The feed rates of the powder blend and oil were 14 gm/min and 18 gm/min respectively. The overall extrudate concentration would be approximately 20% (w/w) of PFA.

The screws in the extruder consist of feed screw elements, mixing paddles and orifice plugs to provide capability for melting, mixing and coveying of the melt blend. A 10 cm wide vertical-exiting film die was used downstream of the extruder to form a film of the PFA/CTFE oil melt blend extrudate. The die gap thickness was set at 0.25 mm. The temperature of the various zones of the extrusion line ranged from 250° C. to 290° C. with an increasing temperature profile from powder feed zone to the die. Screw speed was set at 350 rpm.

The extrudate film was quenched on a rotating chrome plated chill roll. The temperature of the roll was maintained at 205° C. by circulating thermostated silicon oil through its core. The quenched film was rolled up with a motorized take-up unit. Its thickness was approximately 70 microns.

To remove the CTFE oil from the quenched film, a piece of the sample was restrained on a metal frame and placed in an excess volume 1,1,2 trichlorotrifluoroethane (Freon TF) solvent for extraction. The extraction time used was approximately two hours, with one fresh Freon change during this time. The restrained sample was removed from the Freon bath and allowed to dry at room temperature. After drying, the white microporous membrane was further heat set with restraint at 285° C. for 15 mins. The properties of this membrane are:

Final Membrane Thickness=50 microns
Porosity[1] (% void volume )=65%
Mean Isopropyl Alcohol Bubble Point Pressure[2]=37-psi
Isopropyl Alcohol Flow Rate[3] @25° C.=1.7 ml/min/cm$^2$.
Retention of 0.198 micron Diameter Polystyrene Latex Particle[4]: >99%
Retention of 0.109 micron Diameter Polystyrene Latex Particle[4]=9%

Figure 8:
FIG. 8 is a photomicrograph at 5200× the surface of the membrane opposite the surface shown in FIG. 7.
Figure 7:
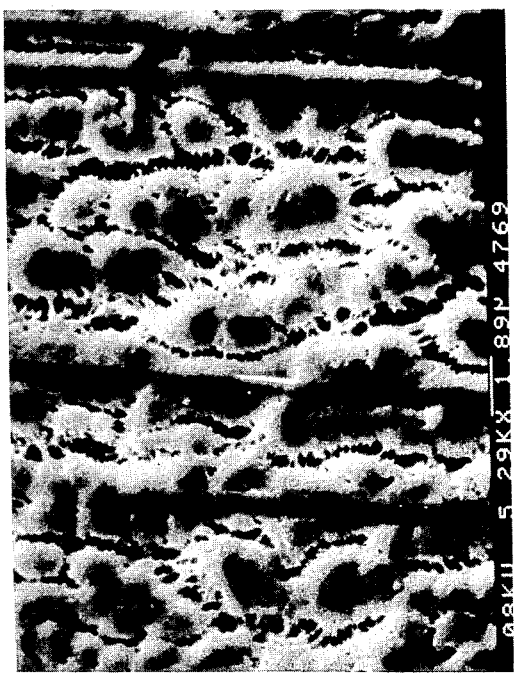
FIG. 7 is a photomicrograph at 5300× one surface of the membrane made by the process of Example 3.
Figure 9:
FIG. 9 is a photomicrograph at 1600× the cross section of the membrane shown in FIG. 7.

The SEM photomicrographs of the above sample are shown in FIGS. 7–9. FIGS. 7 and 8 reveal the surface morphology showing pore openings on both sides. FIG. 9 shows the cross-section of the membrane, revealing its open microporous structure.

EXAMPLE 5

Another permeable PFA membrane was prepared according to Example 3 except the feed rates of the PFA/CTFE powder mixture and CTFE oil were adjusted to give an overall extrudate concentration of 23% (w/w) of PFA. The microporous membrane was heat set with restraint at 250° C. for 15 mins. The properties of this membrane are:

Final Membrane Thickness=60 microns
Porosity[1] (% void volume)=55%
Mean Isopropyl Alcohol Bubble Point Pressure [2]=57 psi
Isopropyl Alcohol Flow Rate[3]@25° C.=0.4 ml/min/cm$^2$
Retention of 0.109 microns Diameter Polystyrene Latex Particle[4]: >95%

(1) Porosity=$[1-(D/D_p)]\times 100\%$ where D=density of microporous sample and $D_p$=density of solid polymer.

(2) A method similar to ASTM F316-80 for determining mean flow pore size was used. Air flow through membrane sample vs applied pressure were measured for a dry membrane sample and for the same sample wet with isopropyl alcohol. The mean bubble point pressure was taken as the pressure when air flow through the wet membrane=($\frac{1}{2}$) air flow through dry membrane.

(3) ASTM F317-72, using isopropyl alcohol as the Permeating liquid.

4. This property relates to the ability of the membrane to retain particles when filtration is performed. Uniform spherical polystyrene latex particles in aqueous suspension from Duke Scientific were used. A stock suspension was diluted to a concentration of $1 \times 10^9$ particles/ml (for 0.198 micron latex) or $4 \times 10^9$ particles/ml (for 0.109 micron latex) with 0.1 volume % Triton X-100 surfactant in water to form the challenge suspension. The membrane sample was wet with isopropyl alcohol and flushed with Triton X-100 solution before the challenge. A volume of challenge suspension corresponding to one monolayer coverage of particles on membrane surface was filtered through at 6 psi differential pressure. The relative concentration of particles in the permeate to the challenge was determined by measuring their absorbance at 310 nm using a UV/VIS spectrophotometer.

$$\text{Retention} = 1 - \left( \frac{\text{Particle Conc. in Permeate}}{\text{Particle Conc. in Challenge}} \right) =$$
$$1 - \left( \frac{\text{Absorbance of Permeate}}{\text{Absorbance of Challenge}} \right)$$

We claim:

1. A process for forming a microporous polymeric-fluorocarbon membrane which comprises:
    (a) forming a melt-blend of a polymer selected from the group consisting of poly (tetrafluoroethyleneco-perfluoro(alkyl vinyl ether)) and poly(tetrafluoroethylene-co-hexafluoropropylene) and a chlorotrifluoroethylene oligomer solvent containing between about 10 and 35 weight percent of polymer based upon the weight of the blend,
    (b) shaping said melt-blend to form a shaped precursor to said membrane,
    (c) cooling said shaped precursor to a temperature at which said solvent separates from the polymer by phase separation to form a gel film,
    (d) selectively extracting said solvent formed from said gel film in step (c) to form a microporous membrane of said polymer and
    (e) drying said membrane from step (d).

2. The process of claim 1 wherein said dried membrane is heat-set under restraint.

3. The process of claim 1 wherein the membrane of step(e) is dried under restraint.

* * * * *